United States Patent [19]

Sundman

[11] Patent Number: 4,687,146
[45] Date of Patent: Aug. 18, 1987

[54] APPARATUS FOR FIBERIZING AND SCREENING OF FIBROUS MATERIALS

[75] Inventor: Frey Sundman, Karhula, Finland

[73] Assignee: A. Ahlstrom Osakeyhtio, Noormarkku, Finland

[21] Appl. No.: 367,179

[22] Filed: Apr. 12, 1982

[30] Foreign Application Priority Data

May 22, 1981 [FI] Finland ................................ 811588

[51] Int. Cl.⁴ .......................................... B02C 13/13
[52] U.S. Cl. .................................. 241/79.3; 162/251; 241/62; 241/70
[58] Field of Search ............. 241/62, 70, 79.3, 273.3, 241/278 A, 279, 280, 284; 162/55, 251; 209/270, 247, 248; 366/225, 226, 228, 234

[56] References Cited

U.S. PATENT DOCUMENTS

| | | | |
|---|---|---|---|
| 240,318 | 4/1881 | Keen | 366/226 X |
| 1,100,745 | 6/1914 | Kenyon | 366/234 X |
| 1,413,644 | 4/1922 | Williamson | 241/181 X |
| 2,846,153 | 8/1958 | Krogh | 241/62 |
| 2,979,096 | 4/1961 | Karge et al. | 366/225 |
| 2,984,861 | 5/1961 | Cox, Jr. et al. | 366/228 X |
| 3,063,683 | 11/1962 | Westbrook | 366/225 X |
| 3,064,948 | 11/1962 | Hallberg | 366/225 X |
| 3,216,345 | 11/1965 | Rigby et al. | 366/225 X |
| 3,343,813 | 9/1967 | Török et al. | 366/228 |
| 3,588,052 | 6/1971 | Scholtz | 366/228 |
| 4,382,559 | 5/1983 | Hellberg | 241/79.3 |

FOREIGN PATENT DOCUMENTS 1456344 12/1965 France ............................... 366/226

Primary Examiner—Howard N. Goldberg
Assistant Examiner—Joseph M. Gorski
Attorney, Agent, or Firm—Bucknam and Archer

[57] ABSTRACT

An apparatus for fiberizing and screening of fibrous material, which comprises of a rotating drum (1) the drum wall (2) of which consists of a non-perforated (7) and a perforated (8) part. The non-perforated part in the inlet end of the drum is separated from the perforated part in the outlet end of the drum by means of a partition wall (9) having an opening (10). The height (h) of the partition wall varies so that a periodical overflow is achieved when the drum rotates.

6 Claims, 12 Drawing Figures

A-A

A-A

A-A

B-B

C-C 4,687,146

APPARATUS FOR FIBERIZING AND SCREENING OF FIBROUS MATERIALS

The present invention relates to an apparatus for fiberizing and screening of a fibrous material, this apparatus comprising a rotating drum, the inlet end of the drum wall of which is non-perforated and the outlet end perforated and the inlet end of which is separated from the outlet end by means of a partition wall having an opening.

The DE AS No. 2651198 discloses a rotating drum of the type outlined above. In the first, non-perforated part of the drum the material to be handled is wetted, treated with chemicals and disintegrated, and in the second, perforated part the material is screened. The drum is provided with a partition wall which forms an overflow sill. Moreover, in the partition wall there are openings through which the material treated in the first part of the drum can pass.

When treating materials which are difficult to disintegrate, such as e.g. plastics-coated waste paper, the retention time of the material in the first part of the drum has to be long. Then the volume flow rate (in a unit of time) will be low. It has been found, however, that a partition wall provided with openings does not bring about the desired impact, but works in an opposite manner. When the voluem flow rate decreases, the retention time becomes shorter.

The partition wall acting as an overflow sill with constant height causes a constant retention time irrespective of the volume flow rate.

The drum can also be provided with a scoop which lifts the material treated in the first part over the partition wall to the second part. Due to this the retention time becomes shorter while the volume flow rate decreases.

It is an object of the present invention to provide an apparatus in which the retention time of the material in the first, non-perforated part of the drum will become longer when the volume flow rate decreases and vice versa.

This is accomplished by making the partition wall so that the height of at least a portion of it varies.

The invention is further described in the following with reference to the accompanying drawings, in which FIG. 1 is a schematical vertical elevational view of an apparatus according to the invention, FIG. 2 is a sectional view as taken on line A—A of FIG. 1, FIG. 3 shows an alternative embodiment of the invention, FIG. 4 shows another alternative embodiment of the invention, FIG. 5 shows a third alternative embodiment of the invention, FIG. 6 is a side view of the structure in FIG. 5, FIG. 7 shows a fourth alternative embodiment, and FIG. 8 is a side view of the structure in FIG. 7.

Figure 1:
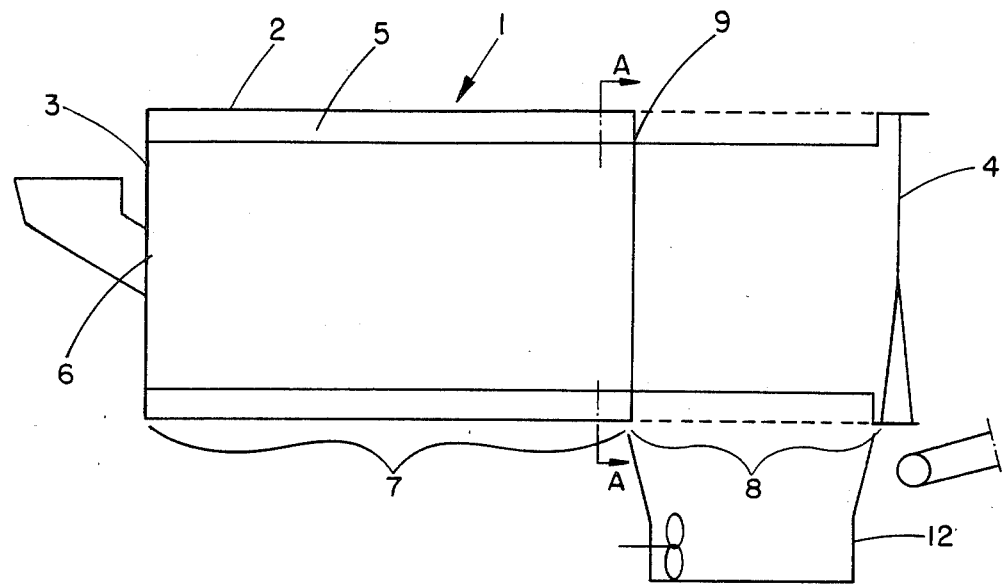
Figure 2:
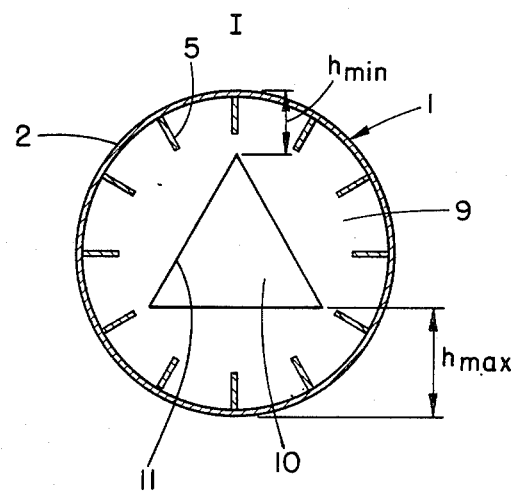

In FIGS. 1 and 2 the reference number 1 refers to a drum, 2 to the drum wall and 3 and 4 to the ends. The drum is provided with longitudinally extending, internal lifting ribs 5, which upon rotation of the drum lift the material to be treated from the bottom of the drum to a higher level, from which the material falls down towards the drum wall and thus breaks up and is exposed to shearing forces which break the fibre bonds. In one end of the drum there is an inlet opening 6 through which the material to be treated is introduced to the drum. An inlet end 7 of the drum wall is nonperforated. An outlet end 8 of the drum wall is perforated. The perforated and non-perforated parts are separated by a partition wall 9 which has a non-round opening 10. The height h of the partition wall, in other words the vertical distance of the inner edge 11 of the partition wall from the drum wall varies.

In the embodiment illustrated in FIG. 2 having a triangular opening 10, the height (h) of the overflow sill varies three times during one revolution from its highest value $h_{max}$ to its lowest value $h_{min}$. Under normal operational conditions when the opening is in the position shown in the drawing no overflow occurs. When the drum has turned 60° and the lowest point of the wall (the point of the opening) is in its lowest position, the overflow is at its maximum. Thus the overflow turns out to be periodical. In practice it has been found that in this manner the desired dependence between the retention time and the volume flow rate is achieved.

Figure 3:
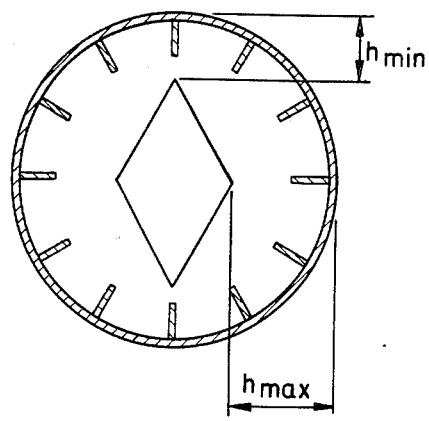
Figure 4:
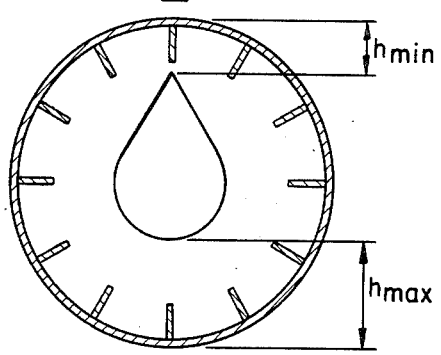

In the embodiment shown in FIG. 3 the height of the overflow sill changes twice from its highest value to the lowest, and in the embodiment shown in FIG. 4, comprised of an arc concentric with the centre axis of the drum and of a V-shaped part, once. With the same $h_{max}$ and $h_{min}$ values the embodiment according to FIG. 4 gives the longest retention time and the embodiment according to FIG. 2 the shortest.

Liquid to which required chemicals have been added is supplied to the drum. The wetted and disintegrated material which has been treated with chemicals flows over the partition wall 9 to the perforated zone of the drum, where the screening takes place. Detached fibres and fibre clusters which may pass through the perforations in the the drum wall are drained off therethrough together with the liquid donw into a tank positioned below the drum. Coarse particles are removed from the drum through the opening in the end 4.

Figure 6:
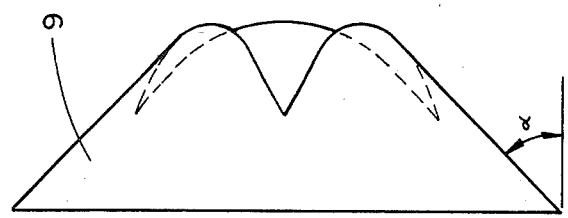
Figure 5:
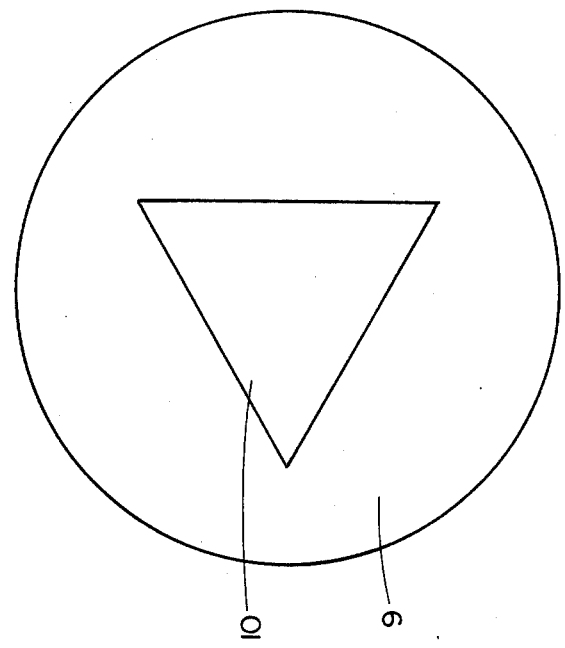

In the embodiment shown in FIGS. 5 and 6 the partition wall 9 is inclined so that it forms an acute angle (α), e.g. 45°, with the surface of the drum wall of the outlet end. Metal strings etc. which tend to get stuck to the partition wall pass through a funnel-shaped partition wall easier than the plane partition wall according to FIGS. 2 to 4.

Figure 8:
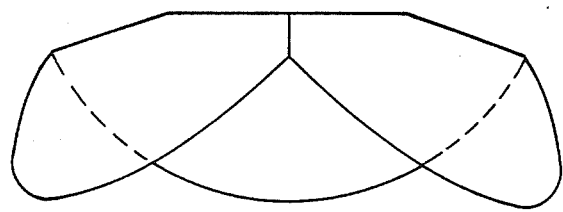
Figure 7:
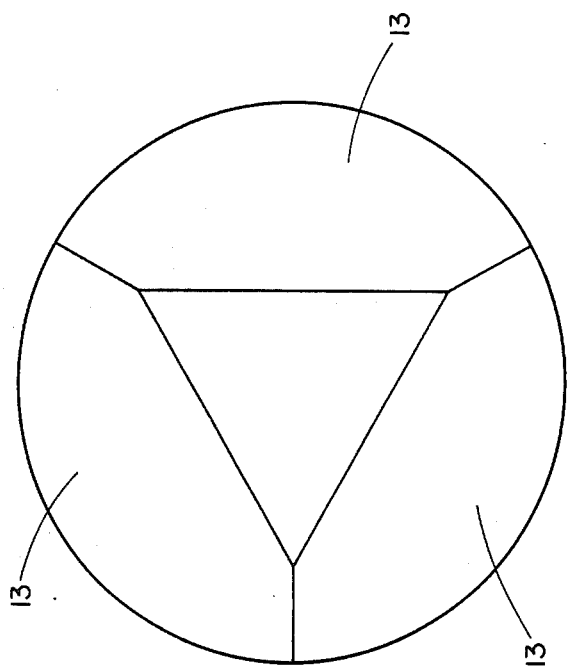
Figure 9:
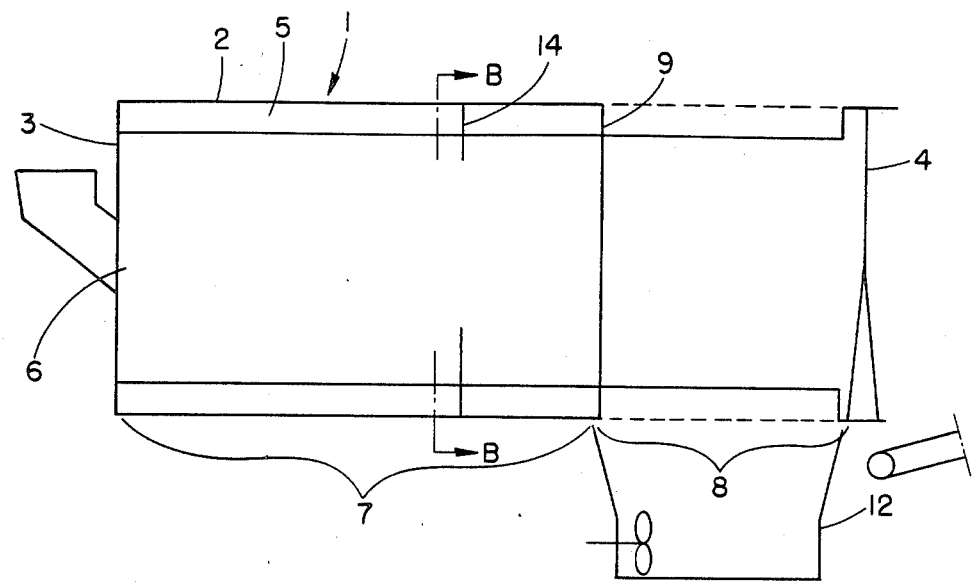
FIG. 9 is a vertical elevational view of the apparatus according to FIG. 1, showing also a partition in the inlet end

The partition wall in FIGS. 7 and 8 is formed by three parts 13 inclined with relation to the surface of the drum wall. It operates in the same way as the previous embodiment. The opening is triangular in both of these embodiments, but it can naturally be of another shape as well.

In the embodiments described above the minimum value $h_{min}$ of the height of the partition wall can be zero. The non-perforated part 7 of the drum wall and the perforated part 8 can also be divided into zones separated from each other by partition wall or walls according to FIGS. 2 to 8. In this way the retention time of the material to be treated in different parts of the drum can be regulated in a desired manner and the different phases of the treatment can thus be controlled.

Figure 10:
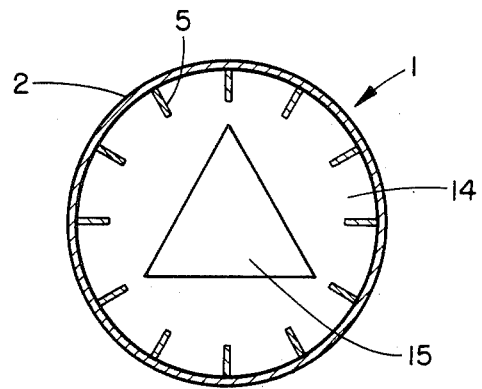
FIG. 10 is a sectional view taken on line B—B of FIG. 9.

Numeral 14 designates the partition in the inlet end and numeral 16 designates the partition in the outlet end Numeral 15 in FIG. 10 designates the opening in the wall 14.

Figure 11:
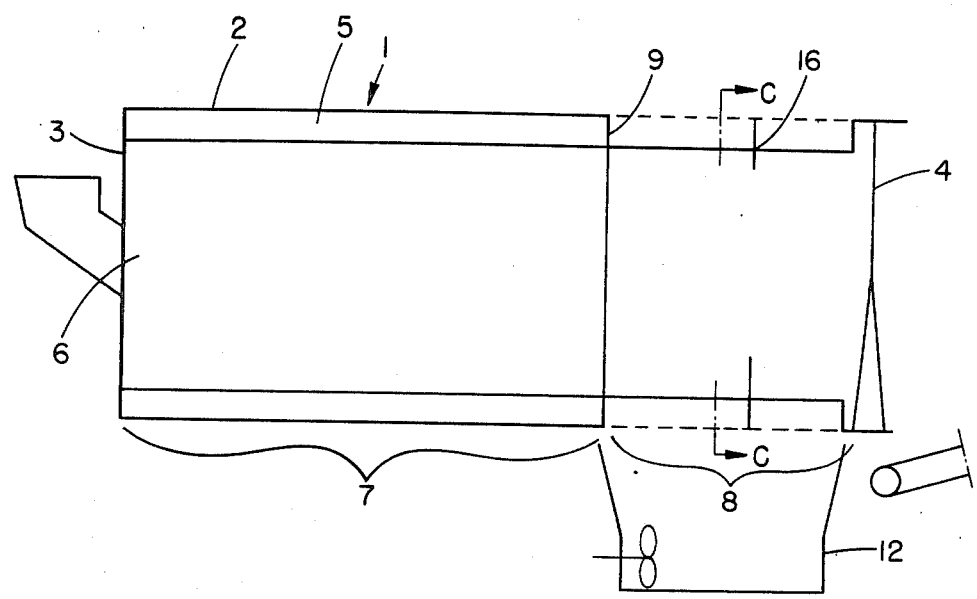
FIG. 11 is a vertical elevational view of the apparatus according to FIG. 1 showing also a partition in the outlet end

Numeral 16 in FIG. 11 designates the partition in the outlet end.

Figure 12:
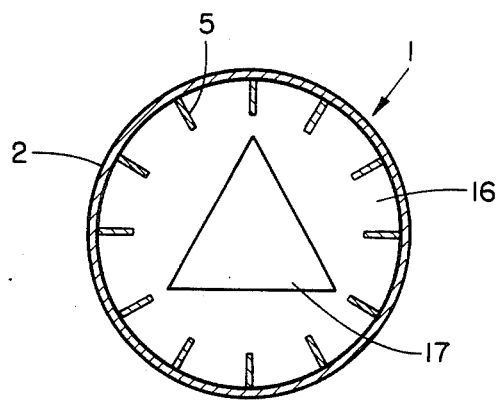
FIG. 12 is a sectional view taken on line C—C of FIG. 11.

Numeral 17 in FIG. 12 designates the opening in the wall 16.

We claim:

1. An apparatus for fiberizing and screening fibrous material, which comprises a drum (1) rotating about a horizontally extending central longitudinal axis, the drum having, two end walls, a side wall interconnecting said two end walls, an inlet end, (7) and an outlet end (8), said side wall being non-perforated at the inlet end (7), said side wall being perforated at the outlet end (8) and the inlet end being separated from the outlet end (8) by means of a first partition wall (9) that extends perpendicularly to said longitudinal axis of the drum, said partition wall having a non-circular opening in the center thereof, so that said longitudinal axis passes through said opening (10), the opening having an edge, wherein the distance from the edge of the opening to the side wall of the drum, along a non-rotating radius which is fixed relative to said longitudinal axis, while the drum is rotating, varies from a maxiumum to a minimum a fixed number of times during a complete revolution of the drum, and wherein the retention time in said non-perforated inlet end increases when the volume flow rate in the inlet end decreases.

2. The apparatus according to claim 1 wherein the distance from the edge of the opening to the side wall of the drum along said non-rotating radius, varies three times during a complete revolution of the drum.

3. The apparatus according to claim 1 wherein a second partition wall is positioned in the non-perforated inlet end (7) of the drum, said second partition wall extending perpendicularly to said longitudinal axis of the drum, said second partition wall having a non-circular opening in the center thereof, so that said longitudinal axis passes through said opening, the opening having an edge, wherein the distance from the edge of the opening to the side wall of the drum, along a non-rotating radius which is fixed relative to said longitudinal axis, while the drum is rotating, varies from a maximum to a minimum a fixed number of times during a complete revolution of the drum, and wherein the retention time in said non-perforated inlet end increases when the volume flow rate in the inlet end decreases.

4. The apparatus according to claim 1 wherein a second partition wall is positioned in the perforated outlet end of the drum, said second partition wall extending perpendicularly to said longitudinal axis of the drum, said second partition wall having a, non-circular opening in the center thereof, so that said longitudinal axis passes through said opening, the opening having an edge, wherein the distance from the edge of the opening to the side wall of the drum, along a non-rotating radius which is fixed relative to said longitudinal axis, while the drum is rotating, varies from a maximum to a minimum a fixed number of times during a complete revolution of the drum, and wherein the retention time in said non-perforated inlet and increases when the volume flow rate in the inlet end decreases.

5. The apparatus according to claim 1 wherein the opening (10) in the partition wall (9) is triangular.

6. The apparatus according to claim 1 wherein the partition wall (9) is inclined and funnel shaped so that it forms an acute triangle with the side wall at the outlet end.

* * * * *